United States Patent [19]
Mason

[11] Patent Number: 5,329,673
[45] Date of Patent: Jul. 19, 1994

[54] SELF TIGHTENING HOSE CLAMP WITH CENTERED SPRING

[75] Inventor: John S. Mason, Lake in the Hills, Ill.

[73] Assignee: R. G. Ray Corporation, Buffalo Grove, Ill.

[21] Appl. No.: 107,984

[22] Filed: Aug. 16, 1993

[51] Int. Cl.⁵ .............................................. B65D 63/00
[52] U.S. Cl. ........................................ 24/279; 24/19; 24/271
[58] Field of Search ............... 24/279, 271, 276, 278, 24/282, 19, 20 LS, 20 S

[56] References Cited

U.S. PATENT DOCUMENTS

| | | | |
|---|---|---|---|
| 2,816,343 | 12/1957 | Decker, Jr. | 24/279 |
| 2,837,383 | 6/1958 | Skelly | 24/279 |
| 2,940,151 | 6/1960 | Skelly | 24/279 |
| 2,955,340 | 10/1960 | Bartler | 24/279 |
| 5,170,540 | 12/1992 | Oetiker | 24/279 |

Primary Examiner—Victor N. Sakran
Attorney, Agent, or Firm—Welsh & Katz, Ltd.

[57] ABSTRACT

A self tightening hose clamp is disclosed, having a band for encircling at least a portion of circumference of a hose and a bolt which extends from a left end of the band through the right end of the band and about the remaining portion of the circumference of the hose. A spring circumscribes an outer end of the bolt and applies a biasing force on the bolt and the right end of the band to maintain a clamping force between the band and the hose during contraction of the hose. A sleeve is disposed between the bolt and spring to coaxially center the spring about the bolt during compression.

14 Claims, 1 Drawing Sheet

U.S. Patent  July 19, 1994  5,329,673
FIG. 1
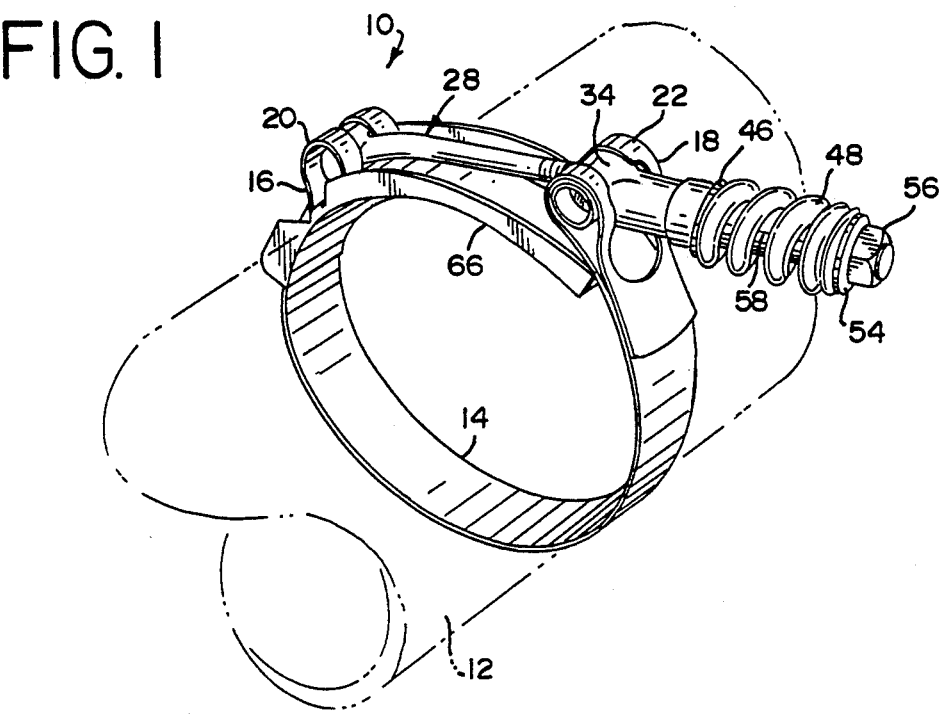
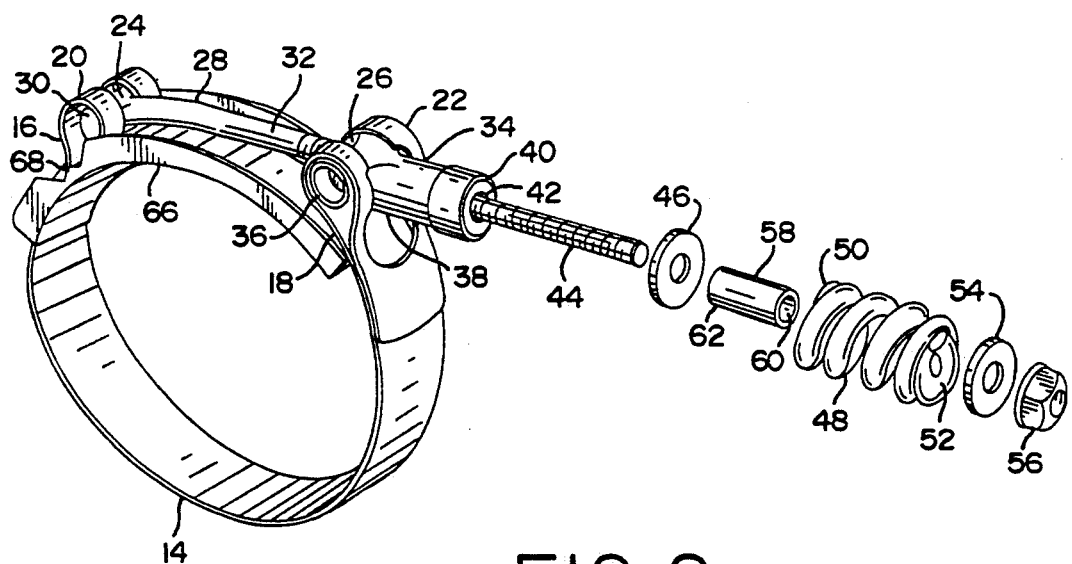
FIG. 2

5,329,673

SELF TIGHTENING HOSE CLAMP WITH CENTERED SPRING

FIELD OF THE INVENTION

The present invention generally relates to a hose clamp and more particularly to self-tightening hose clamps which compensate for minor changes in the diameter of the hose.

BACKGROUND OF THE INVENTION

Hose clamps are used to seal the connection between a hose or other cylindrical conduit and a cylindrical nipple. The clamps encircle the hose and apply a radially inward directed compressive force to cause the hose to form an elastomeric seal with the nipple.

Various types of hose clamps are employed. One of the more prevalent types has a band which extends about the portion of the circumference of the hose. A "T" bolt extends across the remaining portion. The ends of the band form retaining loops, and the "T" bolt has a "T" end which is retained in one of the retaining loops and a bolt shank which extends through the trunnion which is retained in the loop on the other end of the band. A nut is placed on a threaded end of the bolt shank. Tightening the nut forces the ends of the band toward each other which applies tensile force to the band, thereby causing the hose clamp to apply the compressive force on the hose.

One of the drawbacks of the "T" bolt type of hose clamp is what is referred to as a "cold-leak". Cold Leak is a condition brought about by the thermal cycle of the system. Initially, the system is at ambient temperature. As system temperature increases to normal operating temperature, thermal expansion of the nipple may be greater than the thermal expansion of the hose clamps. This difference in thermal expansion may cause an increase in the compressive forces applied to the hose material with a resulting displacement of the material. When the system is shut down and returns to ambient temperature, the thermal contraction of the nipple may exceed thermal contraction of the hose clamps. This difference in thermal contraction may reduce the compressive force applied to the hose to a level less than required to maintain a seal between the hose and nipple, resulting in Cold Leak.

To overcome the drawbacks of cold-leak, certain prior art devices employ a spring which circumscribes the bolt shank of the "T" bolt. The spring applies an outward directed biasing force on the nut on the end of the shank and an opposite biasing force on the trunnion end of the band through which the "T" bolt shank extends. The opposite biasing forces draw the ends of the band together.

When the hose clamp is initially installed, the springs are compressed. During cold weather and as a nipple contracts, the spring compensates for the contraction by increasing in length while continuing to exert the opposing forces on the "T" bolt and trunnion. Such hose clamps are sometimes referred to a self-tightening clamps.

One method to cause the hose clamp to supply a higher compressive force between the hose and the nipple, is to reduce the width of the band while maintain the same tensile force. The decrease in band width while applying the same total tensile force increases the force per unit area exerted on the hose and nipple. In addition, frequently space requirements necessitate a narrow hose clamp while maintaining the same compressive force. However, with the "T" bolt clamp, to decrease the width of the band, the "T" bolt must also be reduced in size.

One of the drawbacks of using a spring self-tightening clamp when reducing the size of the band is that the spring needs to be of a certain size and circumference to exert the proper total compressive force on the hose nipple connection. Thus, the spring must be maintained at a minimum size. However, upon decreasing the size of the "T" bolt to reduce the width of the band while maintaining the size of the spring, the spring may become off centered about the bolt. An off centered spring can bind or exert a non-uniform force on the band which lessens the effectiveness of the self-tightening feature.

It is therefore an object of the present invention to provide a clamping device for forcing a hose into a sealing engagement with an underlying hose, nipple or the like.

Another object of the present invention is to provide a clamping device which seals the connection between a hose and compensates for small variations in the diameter of a hose.

Yet another object of the present invention is to provide a clamping device which utilizes a spring like biasing element and a "T"-bolt feature to self-tighten the clamp. A related object is to provide such a device which maintains the biasing element centered about the bolt.

DESCRIPTION OF THE DRAWINGS

FIG. 1 is a perspective view of a hose clamp embodying the present invention; and FIG. 2 is a perspective, partially exploded view of the clamp of FIG. 1.

DESCRIPTION OF THE PREFERRED EMBODIMENT

Referring to FIG. 1, a hose clamp embodying the present invention is generally indicated at 10. The clamp 10 is shown circumscribing a hose 12 shown in shadow. The hose in turn is disposed about a nipple (not shown).

Referring to FIG. 2, the clamp 10 includes a band 14 having a left end 16 and a right end 18. The band 14 extends about a portion of the circumference of the hose 12 (FIG. 1). The left end 16 includes a loop 20 formed by looping back an outer end portion of the band and attaching, typically by welding, the end to the top surface of the band. The right end 18 includes a right loop 22 formed in a manner similar to the left loop 20. In the left loop 20 an aperture 24 is formed facing the right end 18 while at the right loop 22 a longitudinally extending slot 26 is formed.

A "T" bolt 28 includes a "T" end 30 which is movably secured in the left loop 20 by extending laterally through the loop. The "T" bolt 28 also includes a shank 32 which extends through the aperture 24 and across the remaining portion of the circumference of the hose 12. The shank 32 is slidably received in and extends through a hollow trunnion 34. The trunnion 34 includes a laterally extending "T" portion 36 which engages the loop 22. The "T" portion 36 is moveably secured to the right loop 22 typically by welding.

The trunnion 34 also includes a hollow longitudinally extending portion 38 through which the shank 32 of the "T" bolt 28 extends. A cap 40 having a central aperture 42 may cover the end of the trunnion 34.

The "T" bolt 28 includes a trunnion end portion 44 which extends longitudinally outward from the trunnion 34. The trunnion end portion 44 is typically threaded. Disposed about the end portion 44 and contacting the trunnion 34 at the cap 40 is a washer-like inner spring seat 46.

Circumscribing the trunnion end portion 44 and contacting and extending outward from the inner spring seat 46 is a tubular shaped spring 48. The spring 48 includes an inner end 50 which contacts spring seat 46 and an outer end 52 which contacts a washer-like outer spring seat 54.

A nut 56 threadingly engages the end portion 44 of the "T" bolt 28 and contacts the outer spring seat 54. Tightening the nut 56 forces the outer spring seat 54 toward the trunnion 34 thereby compressing the spring 48. Tightening the nut 56 also causes the "T"-bolt 28 to draw the left end 16 of the band 14 toward the right end 18 thereby tightening the hose clamp.

A substantially tubular centering means or sleeve 58 extends along the end portion 44 of the "T"-bolt shank 32 between the inner seat 46 and the outer seat 54. The sleeve is sized so that the inner surface 60 of the sleeve 58 circumscribes and contacts the end portion 44 of the "T" bolt 28 but the sleeve is able to slide along the end portion. The outer surface 62 of the sleeve 58 is coaxially aligned with the "T"-bolt shank 32 when the inner surface 60 contacts the end portion 44. The outer surface 62 is sized so that it contacts and positions the spring 48 but the sleeve can slide along the length of the spring. Thus, the sleeve 58 coaxially centers the spring 48 about the end portion 44 of the "T" bolt.

The longitudinal length of the sleeve 58 is such that when the spring 48 is fully compressed, the length of the sleeve is slightly less than the length of the compressed spring. This sizing prevents the sleeve 58 from contacting both the inner spring seat 46 and the outer spring seat 54 at the same time. If the sleeve 58 were longer than the compressed length of the spring 48, tightening of the bolt 56 after the sleeve contacts both the inner spring seat 46 and the outer spring seat 54 may cause the sleeve to buckle or otherwise deform.

The clamp 10 also includes an arcuate bridge 66 which extends from the left end 16 of the band 14 to the right end 18 between the "T"-bolt 28 and the hose 12 to prevent pinching of the hose by the ends of the band. The bridge 66 is movably secured to the left end loop 20 by having ears 68 which are bent laterally inward to contact and engage the left end 16 of the band.

Referring to FIG. 1, in operation, the clamp 10 is placed about the nipple (not shown) before the hose is positioned about the nipple. After the hose 12 has been positioned about the nipple, the hose clamp 10 is positioned at the desired location about the hose. The nut 56 is then tightened which causes the "T" bolt 28 to draw the left end 16 of the band 14 toward the right end 18.

As the nut 56 is tightened further the band 14 and bridge 66 engage the outer circumference of the hose 12. Further tightening of the nut 56 causes the band 14 and bridge 66 to apply radially inward directed compressive force about the circumference of the hose 12. The tightening also causes the spring 48 to become compressed between the inner spring seat 46 and the outer spring seat 54.

While the nut 56 is being tightened, thereby compressing the spring 48, the sleeve 58 assures that the spring is maintained coaxially centered about the end portion 44 (FIG. 2) to prevent binding of the spring, and the spring exerts a circumferentially uniform biasing force on the inner spring seat 46 and outer spring seat 54. The uniform force exerted on the inner spring seat 46 is transmitted through the trunnion 34 to the right loop 22 and the uniform force on the outer spring seat 54 is transmitted through the "T"-bolt 28 to the left loop 20.

The nut 56 is typically tightened until the spring 48 is in a fully compressed state, thereby indicating that sufficient force is being applied by the hose clamp 10 on the hose 12 to seal the hose about the nipple (not shown). Should the nipple, hose 12 and clamp 10 be subjected to cooler temperatures, the circumference of the nipple and hose 12 become smaller. As the circumference becomes smaller, the biasing force of the spring 48 on the inner spring seat 46 and outer spring seat 54 causes the right end 18 of the band to be drawn toward the left end 16 of the band to maintain the compressive force about the hose. As the spring 48 lengthens, the sleeve 58 maintains the spring coaxially centered about the end portion 44 of the "T"-bolt to prevent binding of the spring.

A specific embodiment of the novel self tightening hose clamp with centered spring according to the present invention has been described for the purposes of illustrating the manner in which the invention may be made and used. It should be understood that implementation of other variations and modifications of the invention in its various aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed herein.

I claim:

1. A hose clamp for clamping a hose about a nipple, the clamp comprising:
    band means for encircling at least a portion of the circumference of the hose, said band means having a first end and an opposing second end;
    bolt means extending over the remaining portion of the circumference of the hose, said bolt means having a T end movably attached to said first end of said band means and an opposite rod end portion including a first end of said bolt means;
    spring means circumscribing said rod end portion, said spring means having one end operatively contacting said second end of said band means and an other end operatively contacting said bolt means, for biasing said second end of said band means in a direction generally away from said first end of said bolt means; and
    sleeve means disposed between said bolt means and said spring means for coaxially centering said spring means about said rod end portion of said bolt means during compression of said spring.

2. The clamp of claim 1 wherein said first end and said second end of said band form loops.

3. The clamp of claim 1 including a hollow trunnion moveably attached to said second end of said band said rod end portion extending longitudinally through said trunnion, said spring operably contacting said trunnion.

4. The clamp of claim 3 including an inner spring seat disposed about said rod end portion between said spring means and said trunnion.

5. The clamp of claim 1 wherein said sleeve means is adapted to slidingly contact the outer surface of said rod end portion.

6. The clamp of claim 1 wherein said sleeve means is adapted to slidingly contact the inner tubular surface of said spring.

7. The clamp of claim 1 wherein said sleeve means forms a length less than the length of said spring means in a fully compressed position.

8. A hose clamp for clamping a hose about a nipple, the clamp comprising:
- band means for encircling at least a portion of the circumference of the hose, said band means having a first end and an opposing second end;
- bolt means extending over the remaining portion of the circumference of the hose, said bolt means having a head movably attached to said first end and an opposite rod portion including a first end of said bolt means;
- spring means circumscribing said at least a segment of said rod end portion, said spring means having one end operatively contacting said second end of said band means and an other end operatively contacting said bolt means, for biasing said second end of said band means in a direction generally away from said first end of said bolt means to tension the band around the hose; and
- sleeve means disposed between said bolt means and said spring means for coaxially centering said spring means about said rod end portion of said bolt means during compression of said spring.

9. The clamp of claim 8 wherein said first end and said second end of said band form loops.

10. The clamp of claim 9 including a hollow trunnion fixedly attached to said second end of said band said rod end portion extending longitudinally through said trunnion, said spring operably contacting said trunnion.

11. The clamp of claim 10 including an inner spring seat disposed about said rod end portion between said spring means and said trunnion.

12. The clamp of claim 9 wherein said sleeve means is adapted to slidingly contact the outer surface of said rod end portion.

13. The clamp of claim 9 wherein said sleeve means is adapted to slidingly contact the inner tubular surface of said spring.

14. The clamp of claim 9 wherein said sleeve means forms a length less than the length of said spring means in a fully compressed position.

* * * * *